(12) United States Patent
Cho et al.

(10) Patent No.: US 12,456,364 B2
(45) Date of Patent: Oct. 28, 2025

(54) FIRE PREVENTION SYSTEM AND EVALUATION TOOL CALCULATION METHOD USING SAME

(71) Applicant: ROZETATECH Co., Ltd., Gyeonggi-do (KR)

(72) Inventors: Youngjin Cho, Chungcheongbuk-do (KR); Chang-Sik Jung, Seoul (KR)

(73) Assignee: ROZETATECH Co., Ltd., Seongnam-si (KR)

( * ) Notice: Subject to any disclaimer, the term of this patent is extended or adjusted under 35 U.S.C. 154(b) by 21 days.

(21) Appl. No.: 18/701,738

(22) PCT Filed: Oct. 18, 2022

(86) PCT No.: PCT/KR2022/015846
§ 371 (c)(1),
(2) Date: Apr. 16, 2024

(87) PCT Pub. No.: WO2023/068749
PCT Pub. Date: Apr. 27, 2023

(65) Prior Publication Data
US 2024/0412622 A1     Dec. 12, 2024

(30) Foreign Application Priority Data
Oct. 18, 2021   (KR) .................... 10-2021-0138414

(51) Int. Cl.
*G08B 17/00*     (2006.01)
*G08B 5/36*      (2006.01)
(Continued)

(52) U.S. Cl.
CPC ............. *G08B 31/00* (2013.01); *G08B 5/36* (2013.01); *G08B 25/10* (2013.01); *G08B 17/125* (2013.01)

(58) Field of Classification Search
USPC ........... 340/584, 600, 628, 630, 632, 636.11, 340/636.14, 636.17, 640, 643, 655, 660,
(Continued)

(56) References Cited

U.S. PATENT DOCUMENTS 8,200,527 B1 *  6/2012  Thompson ............. G06Q 30/00
                                              705/7.41
10,920,977 B2 *  2/2021  Sim ......................... F22B 35/18
(Continued)

FOREIGN PATENT DOCUMENTS

KR        101460176        11/2014
KR         20150080127      7/2015
(Continued)

OTHER PUBLICATIONS

International Search Report and Written Opinion of the International Searching Authority, mailed on Jan. 25, 2023, from International Application No. PCT/KR2022/015846, filed on Oct. 18, 2022. 6 pages.

(Continued)

*Primary Examiner* — Daniel Previl
(74) *Attorney, Agent, or Firm* — HoustonHogle LLP (57) ABSTRACT

A fire prevention system according to an embodiment of the present invention may include a plurality of first sensors that generate fire information and perform radio frequency (RF) communication with each other, a plurality of second sensors, and a first server that performs the RF communication with the plurality of first sensors and the plurality of second sensors, and the first server may include a digital twin calculation unit, a big data receiving unit that receives big data from an external second server, a server memory, a server communication unit, an area classification unit that divides information into a plurality of portions, a fire index calculation unit that calculates a fire index, and an evaluation (Continued)

tool calculation unit that calculates an evaluation tool that visually implements the fire index in each of the plurality of portions.

17 Claims, 7 Drawing Sheets

(51) Int. Cl.
　　*G08B 25/10* (2006.01)
　　*G08B 31/00* (2006.01)
　　*G08B 17/12* (2006.01)
(58) Field of Classification Search
　　USPC .................. 340/680, 686.1, 286.05, 2.31
　　See application file for complete search history.

(56) References Cited

U.S. PATENT DOCUMENTS

| | | | |
|---|---|---|---|
| 11,488,460 B2 | 11/2022 | Cho | |
| 2005/0192963 A1* | 9/2005 | Tschiegg | G06Q 40/08 707/999.102 |
| 2007/0288208 A1* | 12/2007 | Grigsby | G06Q 10/06 703/2 |
| 2008/0018928 A1* | 1/2008 | Meziani | H04W 12/084 358/1.15 |
| 2013/0270063 A1* | 10/2013 | Yoshinaga | A62C 37/36 198/358 |
| 2017/0052528 A1* | 2/2017 | Suzuki | H04B 7/18513 |
| 2018/0299846 A1* | 10/2018 | Ray | G06Q 10/04 |
| 2018/0308326 A1* | 10/2018 | Miwa | G08B 7/066 |
| 2020/0294642 A1* | 9/2020 | Bostic | G16H 50/20 |
| 2023/0368651 A1 | 11/2023 | Cho | |

FOREIGN PATENT DOCUMENTS

| | | |
|---|---|---|
| KR | 20170010238 | 1/2017 |
| KR | 20170088552 | 8/2017 |
| KR | 102048034 | 11/2019 |
| KR | 102123763 | 6/2020 |
| KR | 20200119114 | 10/2020 |
| KR | 20210075251 | 6/2021 |
| KR | 102289219 | 8/2021 |

OTHER PUBLICATIONS

Written Opinion of the International Searching Authority, mailed on Jan. 25, 2023, from International Application No. PCT/KR2022/015846, filed on Oct. 18, 2022. 4 pages.

International Preliminary Report on Patentability issued on Apr. 23, 2024, from International Application No. PCT/KR2022/015846, filed on Oct. 18, 2022. 11 pages.

* cited by examiner

FIRE PREVENTION SYSTEM AND EVALUATION TOOL CALCULATION METHOD USING SAME

RELATED APPLICATIONS

This application is a § 371 National Phase Application of International Application No. PCT/KR2022/015846, filed on Oct. 18, 2022, now International Publication No. WO/2023/068749, published on Apr. 27, 2023, which International Application claims priority to Republic of Korea Application 10-2021-0138414, filed on Oct. 18, 2021, both of which are incorporated herein by reference in their entirety.

TECHNICAL FIELD

The present invention relates to a fire prevention system that detects the risk of fire occurrence in advance and provides an evaluation tool with improved visibility to users, and an evaluation tool calculation method using the same.

BACKGROUND ART

In general, a sensor is a device that notifies a fire situation when a fire occurs. When a fire is automatically discovered through a sensor that detects heat, smoke, flame, etc. generated by the fire, such a sensor can notify a person concerned or a resident within a building of the occurrence of the fire. However, if the response to the fire occurrence is delayed, golden time may proceed. If the golden time is exceeded when responding to a fire, casualties may increase and property damage may spread.

DISCLOSURE OF THE INVENTION

Technical Problem

An object of the present invention is to provide a fire prevention system that detects the risk of fire occurrence in advance and provides an evaluation tool with improved visibility to users, and an evaluation tool calculation method using the same.

Technical Solution

A fire prevention system according to an embodiment of the present invention may include a plurality of first sensors, each first sensor generating fire information by detecting at least one of heat, smoke, flame, and gas, that perform radio frequency (RF) communication with each other, a plurality of second sensors that are placed in an external facility and generate facility information by measuring a state of the facility, and a first server that performs the RF communication with the plurality of first sensors and the plurality of second sensors, and the first server may include a digital twin calculation unit that provides modeling information by virtually implementing the facility, a big data receiving unit that receives big data from an external second server, a server memory that collects and stores the fire information received from the plurality of first sensors and the facility information received from the plurality of second sensors, a server communication unit that transmits an alarm to a terminal of a user, an area classification unit that divides the modeling information into a plurality of portions based on the big data, the fire information, and the facility information, a fire index calculation unit that calculates a fire index based on the modeling information, the big data, the fire information, and the facility information, and an evaluation tool calculation unit that calculates an evaluation tool that visually implements the fire index in each of the plurality of portions.

Each of the plurality of portions may be displayed in at least one color based on the fire index.

The plurality of portions may include a first portion and a second portion whose fire index is different than that of the first portion, and a first color displayed in the first portion have higher visibility than a second color displayed in the second portion.

The area classification unit may classify the plurality of portions according to an expected scale of damage, and respectively classify the plurality of portions into a plurality of grades based on the fire index and the expected scale of damage.

The plurality of grades may include a first grade and a second grade, the plurality of portions may include a third portion classified into the first grade and a fourth portion classified into the second grade, and the third portion and the fourth portion may have different colors.

The server communication unit may transmit an alarm to the terminal when one of the plurality of portions is classified into the first grade, and may not transmit the alarm when one of the plurality of portions is classified into the second grade.

The area classification unit may update the plurality of portions at each predetermined time.

An image capturing unit that generates image information may be further included, and the area classification unit may divide the modeling information into the plurality of parts by further using the image information.

The plurality of portions may correspond to portions obtained by classifying the facility according to use.

The evaluation tool calculation unit may display the fire information on the evaluation tool.

The first server may calculate a fire escape scenario based on the big data, the fire information, and the facility information, and further include a simulation unit that conducts simulation according to the fire escape scenario.

The evaluation tool calculation unit may display each of the plurality of portions in a different color based on the simulation.

The facility may include turbines for thermal power generation, including a low pressure turbine, an intermediate pressure turbine, and a high pressure turbine, and the area classification unit may divide the modeling information of the turbine into a first portion corresponding to the low pressure turbine, a second portion corresponding to the intermediate pressure turbine, and a third portion corresponding to the high pressure turbine based on the big data, the fire information, and the facility information.

An evaluation tool calculation method according to an embodiment of the present invention may include a step of generating fire information by a plurality of first sensors, a step of measuring a state of an external facility and generating facility information by a plurality of second sensors, a step of generating modeling information by virtually implementing the facility, a step of receiving big data from an external server, a step of dividing the modeling information into a plurality of portions based on the big data, the fire information, and the facility information, a step of calculating a fire index based on the modeling information, the big data, the fire information, and the facility information, and a step of calculating an evaluation tool that visually implements the fire index in each of the plurality of portions.

The step of calculating the evaluation tool may include a step of displaying each of the plurality of portions in at least one color based on the fire index.

A step of calculating a fire escape scenario based on the big data, the fire information, and the facility information, and a step of conducting simulation according to the fire escape scenario may be further included.

The step of calculating the evaluation tool may include a step of displaying each of the plurality of portions in a different color based on the simulation.

Advantageous Effects

According to the matters described above, the fire prevention system can divide the first modeling information into a plurality of optimal portions according to the state of the facility and the environment, and display the degree of risk in a color that can be easily and visually recognized by the user based on the fire index in the plurality of divided portions. A user's on-site response to fire can be improved. Therefore, a fire prevention system with improved reliability can be provided.

MODE FOR CARRYING OUT THE INVENTION

In this specification, when a constituent element (or region, layer, portion, etc.) is referred to as being "located on," "connected to," or "coupled to" another constituent element, it means that the constituent element may be disposed/connected/coupled directly on another constituent element or that a third constituent element may be disposed between them.

The same reference numeral refers to the same constituent element. In addition, in the drawings, the thickness, proportion, and dimensions of constituent elements are exaggerated for effective explanation of technical content.

The term "and/or" includes all of one or more combinations that the associated configurations can define.

Terms such as first, second, etc. may be used to describe various constituent elements, but the constituent elements should not be limited by the terms. The terms are used only for the purpose of distinguishing one constituent element from another constituent element. For example, a first constituent element may be referred to as a second constituent element, and similarly, the second constituent element may also be referred to as the first constituent element without departing from the scope of the present invention. Singular expressions include plural expressions unless the context clearly indicates otherwise.

In addition, terms such as "below," "on the lower side," "above," and "on the upper side" are used to describe the relationship between the constituent elements illustrated in the drawings. The terms are relative conceptual terms and are described based on the direction indicated in the drawings.

Unless otherwise defined, all terms (including technical terms and scientific terms) used in this specification have the same meaning as commonly understood by a person skilled in the art to which the present invention pertains. In addition, terms such as those defined in commonly used dictionaries should be interpreted as having meanings consistent with their meanings in the context of the relevant technology, and may be explicitly defined herein, as long as they are not interpreted in an idealized or overly formal sense.

Terms such as "include" or "have" are intended to designate the existence of features, numbers, steps, operations, constituent elements, parts, or combinations thereof described in the specification, and should be understood as not precluding the existence or addition possibility of one or more other features, numbers, steps, operations, constituent elements, parts, or combinations thereof.

Hereinafter, embodiments of the present invention will be described with reference to the drawings.

Figure 1:
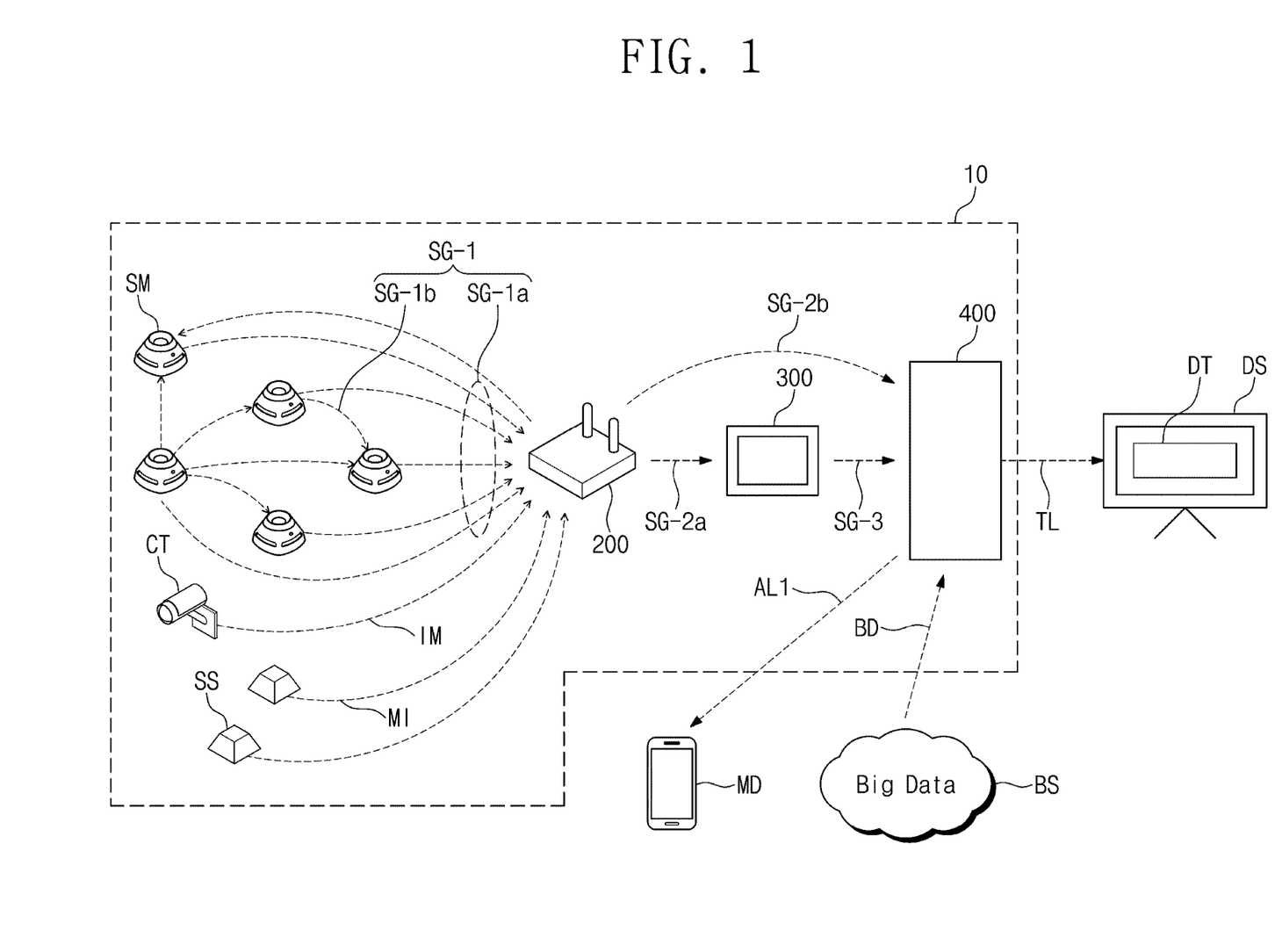
FIG. 1 illustrates a fire prevention system according to an embodiment of the present invention.

FIG. 1 illustrates a fire prevention system according to an embodiment of the present invention.

Referring to FIG. 1, a fire prevention system 10 may include a plurality of first sensors SM, a plurality of second sensors SS, an image capturing unit CT, a repeater 200, a receiver 300, and a first server 400.

Figure 4:
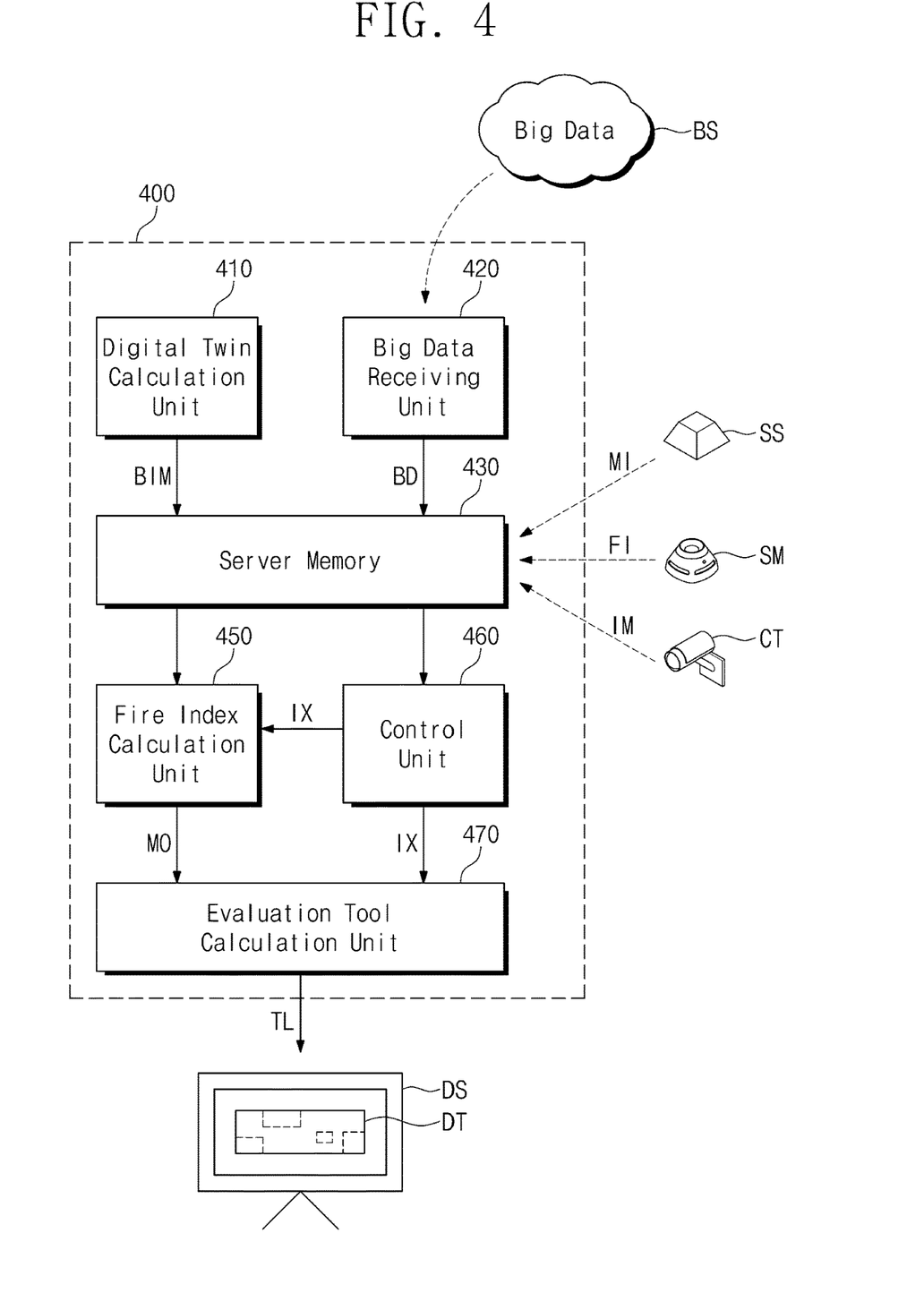
FIG. 4 illustrates an operation of the first server according to an embodiment of the present invention.

Each of the plurality of first sensors SM may collect fire information FI (see FIG. 4). The fire information FI (see FIG. 4) may include information about at least one of the current temperature, smoke, humidity, flame, and gas at a place where each of the plurality of first sensors SM is installed. In addition, each of the plurality of first sensors SM may detect whether or not a fire has occurred.

Each of the plurality of first sensors SM may generate a fire detection signal SG-1. Each of the plurality of first sensors SM may transmit the fire detection signal SG-1 including the fire information FI (see FIG. 4) to adjacent first sensors SM and/or the repeater 200.

The fire detection signal SG-1 may include a first signal SG-1a and a second signal SG-1b. The first signal SG-1a may be a signal generated by the first sensor SM that detects a fire. The second signal SG-1b may be a signal amplified by the first sensor SM.

A radio frequency (RF) communication method may be used as a method of transmitting and receiving the fire detection signal SG-1 and the fire information FI (see FIG. 4). The RF communication method may be a communication method that exchanges information by radiating radio frequencies. The RF communication method is a broadband communication method using frequencies and may have high stability due to low influence of climate and environment. The RF communication method may link voice or other additional functions and may have a high transmission speed. For example, the RF communication method may use frequencies in the 447 MHz to 924 MHz band. However, this is an example, and in one embodiment of the present invention, communication methods such as Ethernet, Wifi, LoRA, M2M, 3G, 4G, LTE, LTE-M, Bluetooth, and WiFi Direct may be used.

In one embodiment of the present invention, the RF communication method may include a listen before transmission (LBT) communication method. This method is a frequency selection method that determines whether a selected frequency is being used by another system, and reselects another frequency when it is determined to be occupied. For example, a node intending to transmit may first listen to a medium, determine whether it is in an idle state, and then send a backoff protocol before transmitting. By distributing data using this LBT communication method, collisions between signals in the same band can be prevented.

The image capturing unit CT may capture an image IM.

Each of the plurality of second sensors SS may collect facility information MI. The facility information MI may include information about a state of the facility, such as the temperature of the facility, rotation speed, the number of rotations, the pressure, and the inflow amount where each of the plurality of second sensors SS is installed.

The repeater 200 may perform RF communication with a plurality of first sensors SM. The repeater 200 may communicate with the image capturing unit CT and a plurality of second sensors SS. For example, the repeater 200 may communicate with 40 first sensors SM. The repeater 200 may receive the fire detection signal SG-1 from the plurality of first sensors SM.

The repeater 200 can convert the fire detection signal SG-1 into a first transmission signal SG-2a. The first transmission signal SG-2a may include the fire information FI (see FIG. 4), the facility information MI, and the image IM. The repeater 200 may transmit the first transmission information SG-2a to the receiver 300.

The repeater 200 can convert the fire detection signal SG-1 into a second transmission signal SG-2b. The second transmission signal SG-2b may include the fire information. The repeater 200 may transmit the second transmission signal SG-2b to the first server 400.

The RF transmission method may be used as a method for transmitting the first transmission signal SG-2a and the second transmission signal SG-2b. That is, the repeater 200 may communicate with the receiver 300 and the first server 400 through the RF communication.

The receiver 300 may receive the first transmission signal SG-2a from the repeater 200. The receiver 300 may convert the first transmission signal SG-2a into a third transmission signal SG-3. The third transmission signal SG-3 may include the fire information FI (see FIG. 4), the facility information MI, and the image IM. The receiver 300 may transmit the third transmission signal SG-3 to the first server 400.

The RF communication method may be used as a method of transmitting the third transmission signal SG-3. That is, the receiver 300 and the first server 400 may communicate with each other through the RF communication.

The first server 400 may determine a fire situation based on the second transmission signal SG-2b received from the repeater 200 and the third transmission signal SG-3 received from the receiver 300.

The first server 400 may receive big data BD from an external second server BS. The big data BD may be updated periodically. Big data (BD) is a means of predicting a diversified society, and may refer to data of a size that exceeds the ability of common software tools to collect, manage, and process within an acceptable curing time. Such large amounts of data can provide more insight than existing limited data.

The first server 400 may calculate a fire index and an evaluation tool. The first server 400 may calculate the fire index and the evaluation tool based on the big data BD, fire information FI (see FIG. 4) collected by a plurality of first sensors SM, the facility information MI collected by a plurality of second sensors SS, and the image IM captured by the image capturing unit CT. This will be described later.

The first server 400 may transmit an alarm AL1 to a terminal MD of a user when the fire index exceeds a predetermined setting value. For example, the terminal MD may be a terminal disposed in a fire department, persons concerned at a place where a fire occurs, a disaster prevention center (or a public institution related to public safety), and a situation room in a building. The user may receive a fire warning message or alarm in the form of a text message, video message, or voice message through the terminal MD.

Figure 2:
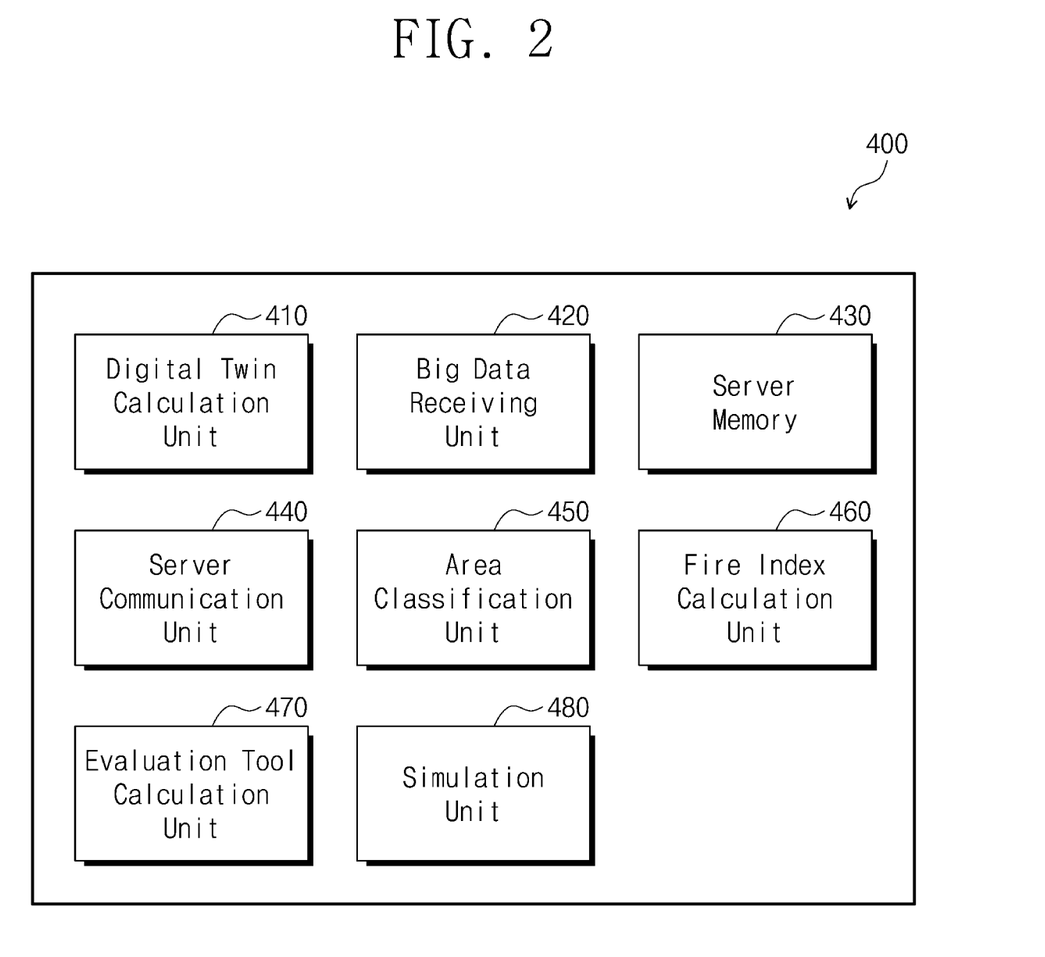
FIG. 2 illustrates a first server according to an embodiment of the present invention.

FIG. 2 illustrates the first server according to an embodiment of the present invention.

Referring to FIG. 1 and FIG. 2, the first server 400 may include a digital twin calculation unit 410, a big data receiving unit 420, a server memory 430, a server communication unit 440, an area classification unit 450, a fire index calculation unit 460, an evaluation tool calculation unit 470, and a simulation unit 480.

The digital twin calculation unit 410 may virtually implement buildings, places, and facilities. A plurality of first sensors SM, a plurality of second sensors SS, and the image capturing unit CT may be disposed in the buildings, places, and facilities. The digital twin calculation unit 410 may provide first modeling information BIM (see FIG. 4) calculated using a digital twin.

The big data receiving unit 420 may receive big data BD from the second server BS. The big data BD may include information about the buildings, places, and facilities. For example, the big data BD may include information about cinemas, information about traditional market buildings, information about museums, information about army headquarters, information about air force headquarters, information about warehouses, information about firing ranges, information about military barracks, information about boilers, information about turbines, and information about thermal power plants, etc.

The big data BD may include surrounding environmental data. For example, the surrounding environment data may include at least one of data corresponding to the probability of fire occurrence by date, data corresponding to the probability of fire occurrence by time, data corresponding to the probability of fire occurrence by place, data corresponding to the probability of fire occurrence by temperature, data corresponding to the probability of fire occurrence by humidity, data corresponding to the probability of fire occurrence by weather, data corresponding to the probability of fire occurrence by industry, and data corresponding to the probability of fire occurrence for each user.

For example, the data corresponding to the probability of fire occurrence by date may include the probability of fire occurrence by day of the week and the probability of fire occurrence by month. The data corresponding to the probability of fire occurrence by time may include the probability of fire occurrence classified by dawn, morning, afternoon, evening, or late night. The data corresponding to the probability of fire occurrence by space may include the probability of fire occurrence classified by urban areas, mountainous regions, beaches, or rural areas. The data corresponding to the probability of fire occurrence by temperature may include the probability of fire occurrence classified by spring, summer, fall, or winter. The data corresponding to the probability of fire occurrence by humidity may include a fire index by specific humidity level.

The data corresponding to the probability of fire occurrence by weather may include the probability of fire occurrence classified by clear days, cloudy days, or rainy days. The data corresponding to the probability of fire occurrence by industry may include the probability of fire occurrence classified by homes, restaurants, factories, or offices. The probability of fire occurrence for each user may include the probability of fire occurrence classified by age, occupation, or gender.

The server memory 430 may store information (e.g., contact information, address, or name) of persons concerned. The server memory 430 may store data for the fire index and the evaluation tool. For example, the server memory 430 may collect and store the fire information FI (see FIG. 4) received from a plurality of first sensors SM, the facility information MI received from a plurality of second sensors SS, and the image IM received from the image capturing unit CT. This will be described later.

The server memory 430 may include a volatile memory or a non-volatile memory. The volatile memory may include a DRAM, SRAM, flash memory, or FeRAM. The non-volatile memory may include an SSD or HDD.

The server communication unit 440 may transmit a warning message to the terminal MD of the user when there is a possibility of fire occurrence and/or when a fire occurs.

The area classification unit 450 may divide the first modeling information BIM (see FIG. 4) into a plurality of portions based on the big data BD, the fire information FI (see FIG. 4), and the facility information MI. The area classification unit 450 may calculate second modeling information MO (see FIG. 4) based on the first modeling information BIM (see FIG. 4). The first modeling information BIM (see FIG. 4) divided into a plurality of portions may be referred to as the second modeling information MO (see FIG. 4).

The fire index calculation unit 460 may calculate the fire index IX (see FIG. 4) based on the first modeling information BIM (see FIG. 4), the big data BD, the fire information FI (see FIG. 4), and the facility information MI.

The evaluation tool calculation unit 470 may calculate an evaluation tool TL (see FIG. 4) that visually implements the fire index in each of the plurality of portions of the second modeling information MO (see FIG. 4).

The simulation unit 480 may calculate a fire escape scenario based on the big data BD, the fire information FI (see FIG. 4), and the facility information MI. The simulation unit 480 may conduct simulation according to the fire escape scenario.

Figure 3:
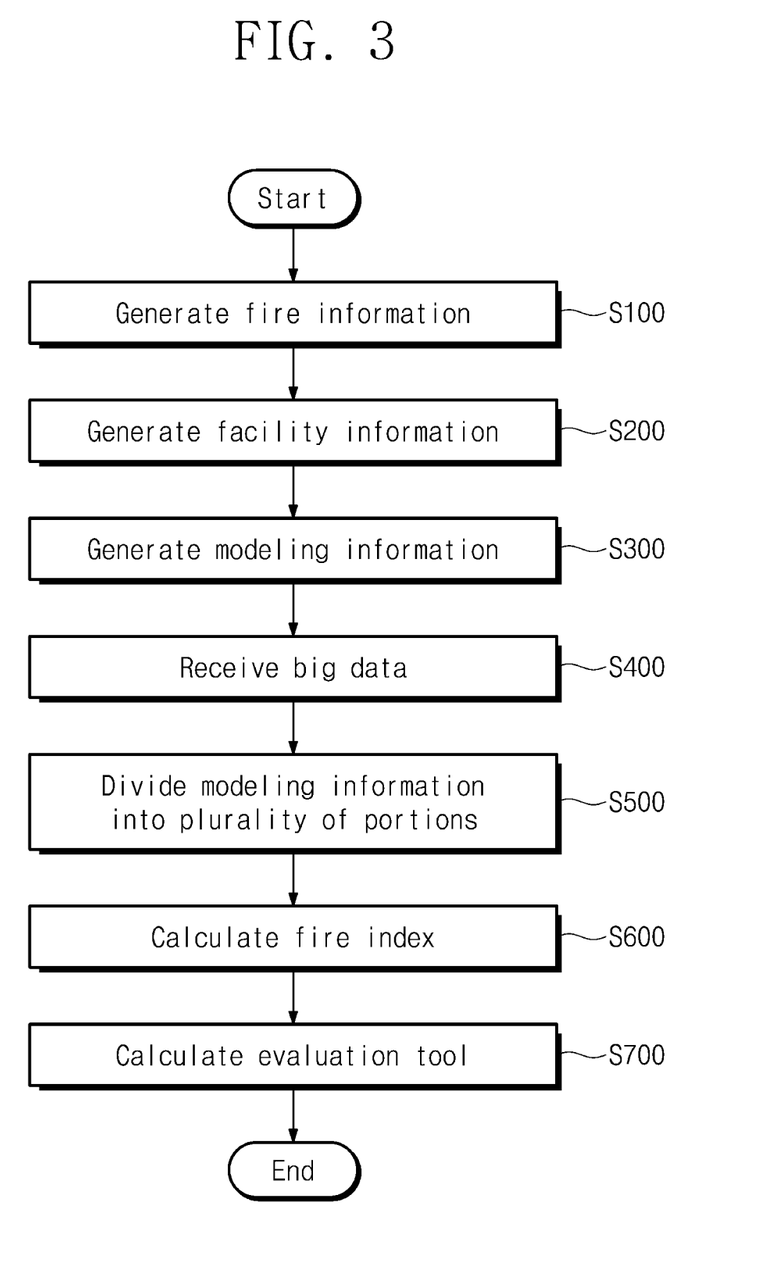
FIG. 3 is a flowchart illustrating an evaluation tool calculation method according to an embodiment of the present invention.

FIG. 3 is a flowchart illustrating an evaluation tool calculation method according to an embodiment of the present invention, and FIG. 4 illustrates an operation of the first server according to an embodiment of the present invention.

Referring to FIGS. 1 to 4, a plurality of first sensors SM may generate fire information FI (S100). The fire information FI may include information about at least one of current temperature, smoke, humidity, flame, and gas, and the fire information FI may be generated regardless of whether or not a fire has occurred. The fire information FI may be stored in the server memory 430.

A plurality of second sensors SS may generate the facility information MI (S200). The plurality of second sensors SS may be installed in the facility. The facility information MI may be information about the facility where the plurality of second sensors SS are installed. The facility information MI may include the temperature of the facility, the rotation speed, the number of rotations, the pressure, the inflow amount, etc. The facility information MI may be stored in the server memory 430.

The digital twin calculation unit 410 may generate the first modeling information BIM (S300). The first modeling information BIM may be information that implements the facility and the place where the facility is disposed using the digital twin technology. The digital twin may be defined as a technology that creates a twin of an object in reality on a computer and predicts the result in advance by simulating a situation that may occur in reality with the computer. The first modeling information BIM may be stored in the server memory 430.

The big data receiving unit 420 may receive big data BD from the external second server BS (S400). The big data BD may be stored in the server memory 430.

The area classification unit 450 may divide the first modeling information BIM into a plurality of portions to calculate the second modeling information MO (S500). The area classification unit 450 may receive the first modeling information BIM from the server memory 430. The area classification unit 450 may update the plurality of portions at each predetermined time.

According to the present invention, the fire prevention system 10 may grasp the situation in which a fire will occur and/or the situation in which a fire occurs in real time. The plurality of first sensors SM may generate the fire information FI in real time, and the plurality of second sensors SS may generate the facility information MI in real time. The area classification unit 450 may divide the first modeling information BIM into a plurality of portions based on pieces of information generated in real time. The second modeling information MO divided into a plurality of portions may be updated at each predetermined time. The fire prevention system 10 may calculate the evaluation tool TL based on the second modeling information MO updated at each predetermined time. Accordingly, it is possible to provide the fire prevention system 10 that can divide the first modeling information BIM into a plurality of optimal portions according to the state of the facility and the environment.

In addition, according to the present invention, the fire prevention system 10 utilizes the digital twin technology to understand past and present operating conditions and predict the future by combining data and information representing the structure, context, and operation of various physical systems. That is, by receiving the physical system, such as facilities and surroundings, as data and information, it is possible to predict the occurrence of a fire and/or the possibility of the fire occurrence, so that appropriate measures may be taken within a golden time, and damage to life or property may be prevented. In addition, the user's on-site response to fire can be improved. Accordingly, the fire prevention system 10 with improved reliability can be provided.

The fire index calculation unit 460 may calculate the fire index IX based on the first modeling information BIM, the big data BD, the fire information FI, the facility information MI, and the image IM. The fire index calculation unit 460 may receive the first modeling information BIM, the big data BD, the fire information FI, the facility information MI, and the image IM from the server memory 430.

The evaluation tool calculation unit 470 may calculate the evaluation tool TL that visually implements the fire index IX in each of the plurality of portions of the second modeling information MO (S700). For example, the evaluation tool TL may be information implemented as a digital twin by displaying fire-related information calculated from the fire index IX in the second modeling information MO in the form of a tool such as a pop-up window. The first server 400 may transmit the evaluation tool TL to a display DS through the server communication unit 440.

The user may be provided with a digital twin DT including the evaluation tool TL through the external display DS.

Unlike the present invention, if the response to a fire occurs late, damage to life or property may occur. In addition, there is a possibility of exceeding the golden time for a fire. For example, if it exceeds 5 minutes of golden time, casualties may increase by more than two times and property damage may increase by more than three times. However, according to the present invention, the fire prevention system 10 can easily visually provide the user with a zone where a fire has occurred and/or a zone where a fire is likely to occur based on the evaluation tool TL. The user may can prevent a fire and/or take action against the fire based on the digital twin DT that includes the evaluation tool TL. In other words, the user can take appropriate action within the golden time using the fire prevention system 10. Accordingly, the fire prevention system 10 with improved reliability can be provided.

Figure 5:
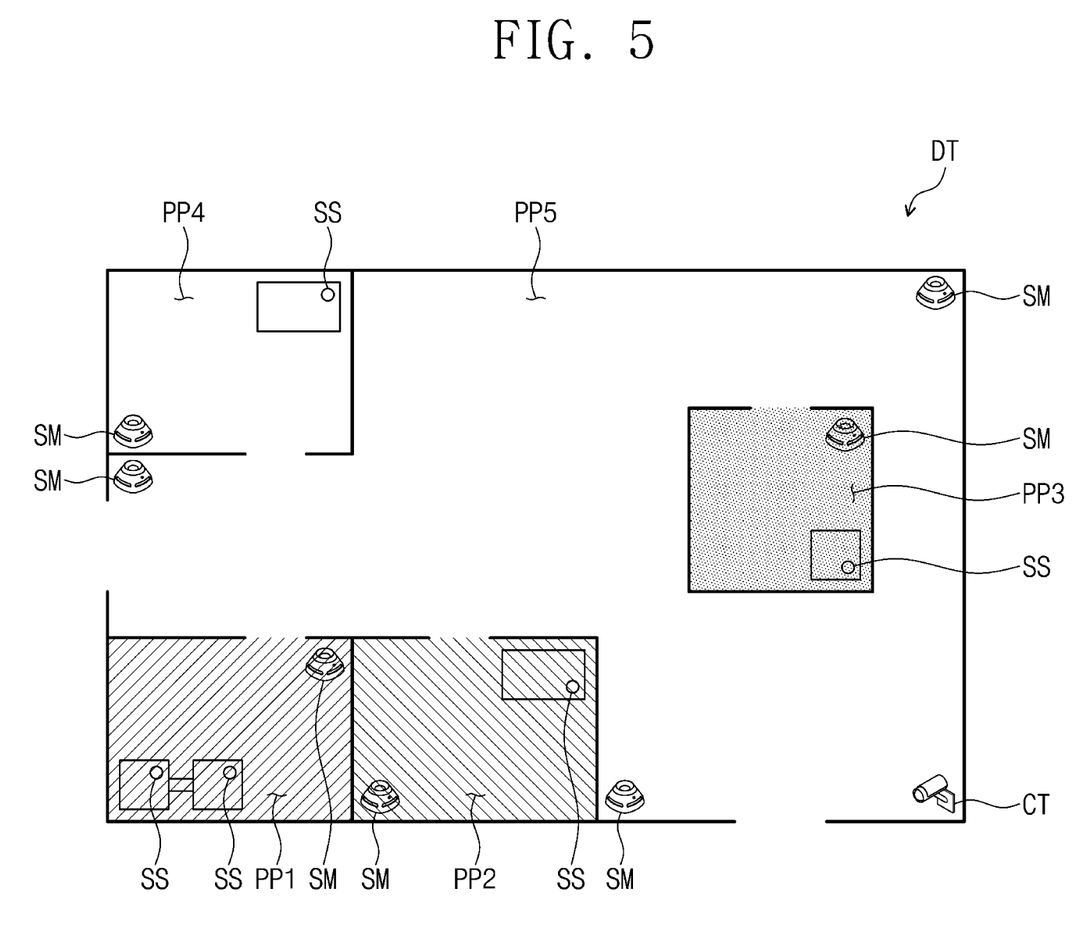
FIG. 5 illustrates a digital twin including an evaluation tool according to an embodiment of the present invention.

FIG. 5 illustrates a digital twin including an evaluation tool according to an embodiment of the present invention.

Referring to FIGS. 4 and 5, FIG. 5 may illustrate the digital twin DT that calculates a specific floor of a building. A plurality of first sensors SM and the image capturing unit CT may be installed on the specific floor. A plurality of second sensors SS may be disposed in each of the facilities installed on the specific floor. Although not illustrated in FIG. 5, the building according to an embodiment of the present invention may include the repeater 200 (see FIG. 1), the receiver 300 (see FIG. 1), and the first server 400 (see FIG. 1).

The digital twin calculation unit 410 may calculate the first modeling information BIM.

The area classification unit 450 may divide the information into a plurality of portions PP1 to PP5 based on the big data BD, the fire information FI, and the facility information MI. The area classification unit 450 may calculate the second modeling information MO including the plurality of portions PP1 to PP5.

The fire index calculation unit 460 may calculate the fire index IX based on the first modeling information BIM, the fire information FI, and the facility information MI.

The evaluation tool calculation unit 470 may calculate the evaluation tool TL that is visually implemented fire risk by combining the second modeling information MO and the fire index IX.

Each of the plurality of portions PP1 to PP5 may be displayed in at least one color based on the fire index IX. For example, if two of the plurality of portions PP1 to PP5 have the same fire index IX, they may be displayed in the same color.

The plurality of portions PP1 to PP5 may include the first portion PP1, the second portion PP2, the third portion PP3, the fourth portion PP4, and the fifth portion PP5.

For example, the fire index IX of the first portion PP1 may be higher than the fire index IX of the second portion PP2. This may mean that the possibility of a fire occurring in the first portion PP1 is higher than the possibility of a fire occurring in the second portion PP2. In this case, the first color displayed in the first portion PP1 may have higher visibility than the second color displayed in the second portion PP2. Accordingly, the user may be visually easily provided with the possibility of a fire occurrence through the digital twin DT including the evaluation tool TL.

The area classification unit 450 may classify the plurality of portions PP1 to PP5 according to an expected scale of damage. The expected scale of damage may mean the scale of damage expected when a fire occurs. The area classification unit 450 may classify the plurality of portions PP1 to PP5 into a plurality of grades based on the fire index IX and the expected damage scale.

For example, the plurality of grades may include a first grade and a second grade. The first grade may be more likely to cause a fire than the second grade. The third portion PP3 may be classified into the first grade. The fourth portion PP4 may be classified into the second grade. In this case, the third portion PP3 and the fourth portion PP4 may have different colors. Therefore, the user may be visually easily provided with the possibility of a fire occurrence through the digital twin DT including the evaluation tool TL.

In addition, the server communication unit 440 may transmit an alarm AL1 (see FIG. 1) to the terminal MD (see FIG. 1) when at least one of the plurality of portions PP1 to PP5 is classified into the first grade. The server communication unit 440 may not transmit an alarm when at least one of the plurality of portions PP1 to PP5 is classified into the second grade.

Figure 6:
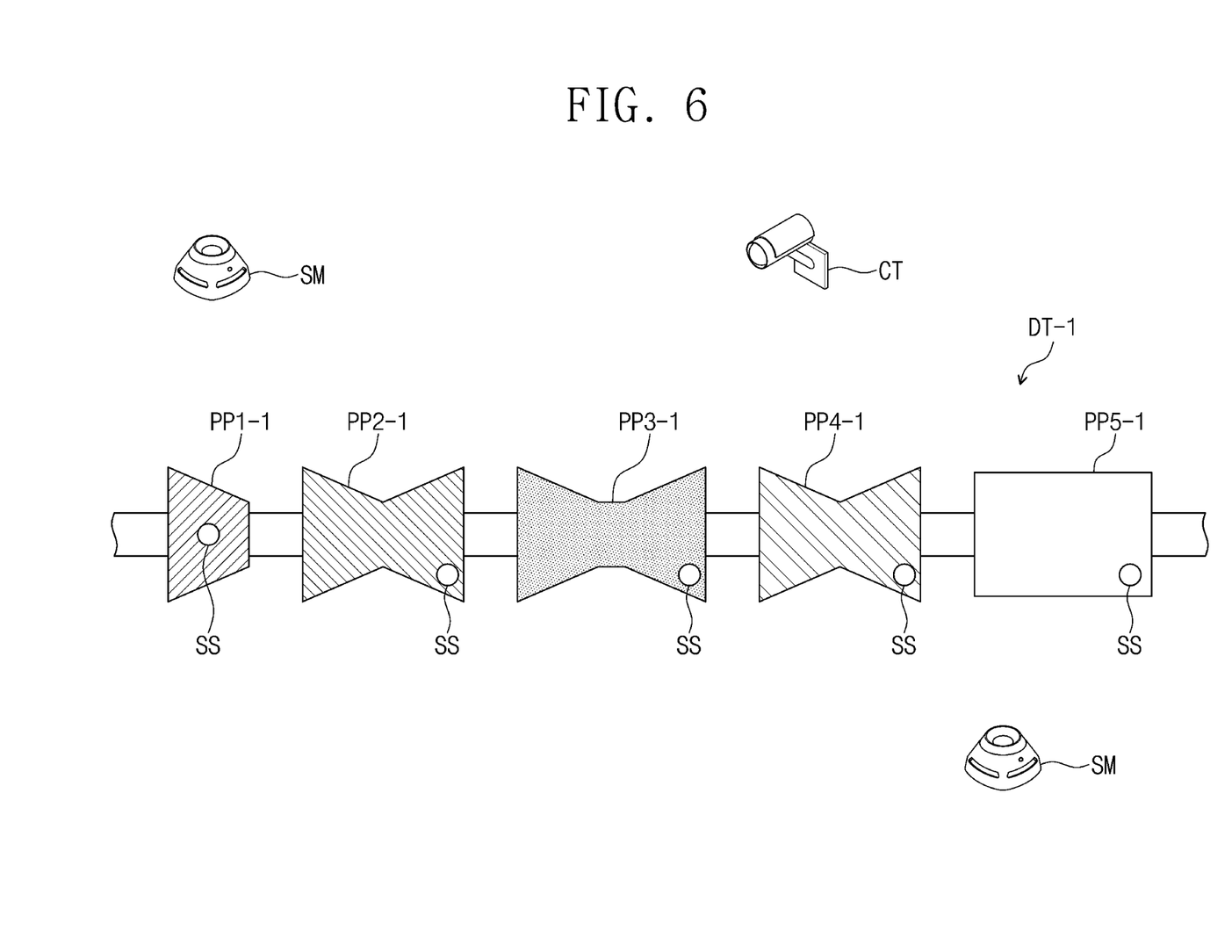
FIG. 6 illustrates a digital twin including an evaluation tool according to an embodiment of the present invention.

FIG. 6 illustrates a digital twin including an evaluation tool according to an embodiment of the present invention.

Referring to FIGS. 4 and 6, FIG. 6 may illustrate a digital twin DT-1 that calculates a turbine for thermal power generation of a thermal power plant. The turbine for thermal power generation may include a high pressure turbine, a first intermediate pressure turbine, a second intermediate pressure turbine, and a low pressure turbine.

At least one second sensor SS may be installed in each of the high pressure turbine, the first intermediate pressure turbine, the second intermediate pressure turbine, and the low pressure turbine. For example, the second sensor SS may sense the temperature of the facility, the rotational speed of the turbine, the number of rotations of the turbine, and the pressure. The plurality of first sensors SM and the image capturing unit CT may be installed at a place where the turbine is installed. Although not illustrated in FIG. 6, the thermal power plant according to an embodiment of the present invention may include the repeater 200 (see FIG. 1), the receiver 300 (see FIG. 1), and the first server 400 (see FIG. 1).

The digital twin calculation unit 410 may calculate the first modeling information BIM.

The area classification unit 450 may divide the first modeling information BIM of the turbine into a first portion PP1-1 corresponding to the low pressure turbine, a second portion PP2-1 corresponding to the first intermediate pressure turbine, a third portion PP3-1 corresponding to the second intermediate pressure turbine, a fourth portion PP4-1 corresponding to the high pressure turbine, and a fifth portion PP5-1 corresponding to the generator, based on the big data BD, the fire information FI, and the facility information MI. A plurality of portions PP1-1 to PP5-1 may correspond to portions obtained by classifying the facility according to use.

The area classification unit 450 may calculate the second modeling information MO including the plurality of portions PP1-1 to PP5-1.

The fire index calculation unit 460 may calculate the fire index IX based on the first modeling information BIM, the fire information FI, and the facility information MI.

The evaluation tool calculation unit 470 may calculate the evaluation tool TL that visually implements a combination of the second modeling information MO and the fire index IX.

Each of the plurality of portions PP1-1 to PP5-1 may be displayed in at least one color based on the fire index IX.

According to the present invention, the fire prevention system 10 may divide the first modeling information BIM into a plurality of optimal portions PP1-1 to PP5-1 according to the state of the facility and the environment, and display the degree of risk in a color that can be easily and visually recognized by the user, based on the fire index IX in the plurality of divided portions PP1-1 to PP5-1. The user's on-site response to fire can be improved. Accordingly, the fire prevention system 10 with improved reliability can be provided.

Figure 7:
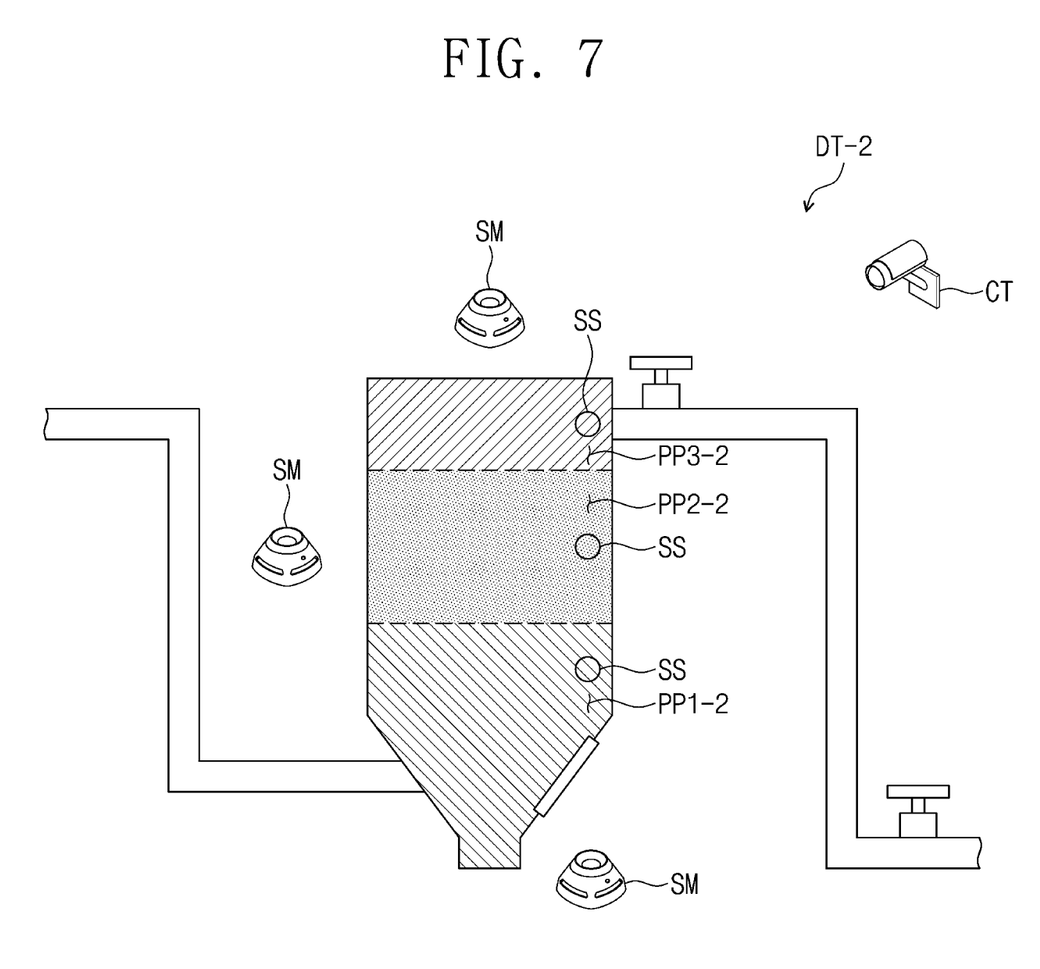
FIG. 7 illustrates a digital twin including an evaluation tool according to an embodiment of the present invention.

FIG. 7 illustrates a digital twin including an evaluation tool according to an embodiment of the present invention.

Referring to FIGS. 4 and 7, FIG. 7 may illustrate a digital twin DT-2 that calculates a desulfurization facility of a thermal power plant. However, this is an example and the facility according to an embodiment of the present invention is not limited thereto. For example, the facility according to one embodiment of the present invention may include a boiler of a thermal power plant. The desulfurization facility may include a first zone in which limestone is disposed, a second zone in which a desulfurization agent is disposed, and a third zone through which gas from which hydrogen sulfide is removed passes.

At least one second sensor SS may be installed in each of the first to third zones. For example, the second sensor SS may sense the pressure and gas inflow amount within the zone. A plurality of first sensors SM and the image capturing unit CT may be installed at a place where the desulfurization facility is installed. Although not illustrated in FIG. 7, the thermal power plant according to an embodiment of the present invention may include the repeater 200 (see FIG. 1), the receiver 300 (see FIG. 1), and the first server 400 (see FIG. 1).

The digital twin calculation unit 410 may calculate the first modeling information BIM.

The area classification unit 450 may divide the first modeling information BIM of the desulfurization facility into a first portion PP1-2 corresponding to the first zone, a second portion PP2-2 corresponding to the second zone, a third portion PP3-2 corresponding to the third zone, based on the big data BD, the fire information FI, and the facility information MI. A plurality of portions PP1-2 to PP3-2 may correspond to portions that obtained by classifying the facility according to use.

The area classification unit 450 may calculate the second modeling information MO including the plurality of portions PP1-2 to PP3-2.

The fire index calculation unit 460 may calculate the fire index IX based on the first modeling information BIM, the fire information FI, and the facility information MI.

The evaluation tool calculation unit 470 may calculate the evaluation tool TL that visually implements a combination of the second modeling information MO and the fire index IX.

Each of the plurality of portions PP1-2 to PP3-2 may be displayed in at least one color based on the fire index IX.

According to the present invention, the fire prevention system 10 may divide the first modeling information BIM into a plurality of optimal portions PP1-2 to PP3-2 according to the state of the facility and the environment, and display the degree of risk in a color that can be easily and visually recognized by the user based on the fire index IX in the plurality of divided portions PP1-2 to PP3-2. The user's on-site response to fire can be improved. Therefore, the fire prevention system 10 with improved reliability can be provided.

In the matters described above, the present invention has been described with reference to preferred embodiments, but a person skilled in the relevant technical field or a person with ordinary knowledge in the relevant technical field will understand that various modifications and changes can be made to the present invention without departing from the scope of spirit and technique of the present invention as set forth in the claims to be described later. Therefore, the technical scope of the present invention should not be limited to what is described in the detailed description of the specification, but should be defined by the scope of the claims.

INDUSTRIAL APPLICABILITY

Rapid fire response is essential in a fire prevention system. The risk of fire occurrence can be provided to the user through the evaluation tool. Therefore, the present invention related to the fire prevention system and the evaluation tool calculation method using the same has high industrial applicability.

The invention claimed is:

1. A fire prevention system comprising:
   a plurality of first sensors, each first sensor generating fire information by detecting at least one of heat, smoke, flame, and gas, that perform radio frequency (RF) communication with each other;
   a plurality of second sensors that are placed in an external facility and generate facility information by measuring a state of the facility; and
   a first server that performs the RF communication with the plurality of first sensors and the plurality of second sensors, wherein
   the first server includes
      a digital twin calculation unit that provides modeling information by virtually implementing the facility,
      a big data receiving unit that receives big data from an external second server,
      a server memory that collects and stores the fire information received from the plurality of first sensors and the facility information received from the plurality of second sensors,
      a server communication unit that transmits an alarm to a terminal of a user,
      an area classification unit that divides the modeling information into a plurality of portions based on the big data, the fire information, and the facility information,
      a fire index calculation unit that calculates a fire index based on the modeling information, the big data, the fire information, and the facility information, and
      an evaluation tool calculation unit that calculates an evaluation tool that visually implements the fire index in each of the plurality of portions.

2. The system of claim 1, wherein
   each of the plurality of portions is displayed in at least one color based on the fire index.

3. The system of claim 1, wherein
   the plurality of portions include a first portion and a second portion whose fire index is different than that of the first portion, and a first color displayed in the first portion has higher visibility than a second color displayed in the second portion.

4. The system of claim 1, wherein the area classification unit classifies the plurality of portions according to an expected scale of damage, and respectively classifies the plurality of portions into a plurality of grades based on the fire index and the expected scale of damage.

5. The system of claim 4, wherein
the plurality of grades includes a first grade and a second grade,
the plurality of portions includes a third portion classified into the first grade and a fourth portion classified into the second grade, and
the third portion and the fourth portion have different colors.

6. The system of claim 5, wherein
the server communication unit transmits an alarm to the terminal when one of the plurality of portions is classified into the first grade, and does not transmit the alarm when one of the plurality of portions is classified into the second grade.

7. The system of claim 1, wherein
the area classification unit updates the plurality of portions at each predetermined time.

8. The system of claim 1, further comprising:
an image capturing unit that generates image information, wherein
the area classification unit divides the modeling information into the plurality of parts by further using the image information.

9. The system of claim 1, wherein
the plurality of portions correspond to portions obtained by classifying the facility according to use.

10. The system of claim 1, wherein
the evaluation tool calculation unit displays the fire information on the evaluation tool.

11. The system of claim 1, wherein
the first server calculates a fire escape scenario based on the big data, the fire information, and the facility information, and further includes a simulation unit that conducts simulation according to the fire escape scenario.

12. The system of claim 11, wherein
the evaluation tool calculation unit displays each of the plurality of portions in a different color based on the simulation.

13. The system of claim 1, wherein
the facility includes turbines for thermal power generation, including a low pressure turbine, an intermediate pressure turbine, and a high pressure turbine, and
the area classification unit divides the modeling information of the turbine into a first portion corresponding to the low pressure turbine, a second portion corresponding to the intermediate pressure turbine, and a third portion corresponding to the high pressure turbine based on the big data, the fire information, and the facility information.

14. An evaluation tool calculation method comprising:
a step of generating fire information by a plurality of first sensors;
a step of measuring a state of an external facility and generating facility information by a plurality of second sensors;
a step of generating modeling information by virtually implementing the facility;
a step of receiving big data from an external server;
a step of dividing the modeling information into a plurality of portions based on the big data, the fire information, and the facility information;
a step of calculating a fire index based on the modeling information, the big data, the fire information, and the facility information; and
a step of calculating an evaluation tool that visually implements the fire index in each of the plurality of portions.

15. The method of claim 14, wherein
the step of calculating the evaluation tool includes a step of displaying each of the plurality of portions in at least one color based on the fire index.

16. The method of claim 14, further comprising:
a step of calculating a fire escape scenario based on the big data, the fire information, and the facility information; and
a step of conducting simulation according to the fire escape scenario.

17. The method of claim 16, wherein
the step of calculating the evaluation tool includes a step of displaying each of the plurality of portions in a different color based on the simulation.

* * * * *